United States Patent [19]

Jackson

[11] Patent Number: 4,964,224

[45] Date of Patent: Oct. 23, 1990

[54] SHAFT ALIGNMENT APPARATUS

[76] Inventor: Lawrence B. Jackson, 515 S. 5th, Kelso, Wash. 98626

[21] Appl. No.: 381,473

[22] Filed: Jul. 18, 1989

[51] Int. Cl.⁵ .............................................. G01B 3/38
[52] U.S. Cl. ........................................ 33/645; 33/412; 33/655
[58] Field of Search ................. 33/412, 447, 645, 655, 33/661; 248/231, 904

[56] References Cited

U.S. PATENT DOCUMENTS

| | | | |
|---|---|---|---|
| 2,833,051 | 5/1958 | Cunningham | 33/661 X |
| 2,866,631 | 12/1958 | Cink | 33/21.3 X |
| 3,525,158 | 8/1970 | Torlay | 33/412 X |
| 3,664,029 | 5/1972 | Clucoft | 33/412 X |
| 3,733,706 | 5/1973 | Blohm | 33/412 X |
| 4,578,869 | 4/1986 | O'Brien | 33/655 |

Primary Examiner—Harry N. Haroian
Attorney, Agent, or Firm—Leon Gilden

[57] ABSTRACT

A shaft alignment apparatus is set forth utilizing a "W" shaped yoke securable over a first shaft wherein the yoke includes an upwardly extending support rod with a first clamp secured thereto to coaxially align a second clamp and enable positioning an associated dial indicator 'micrometer' to an adjacent shaft.

6 Claims, 2 Drawing Sheets

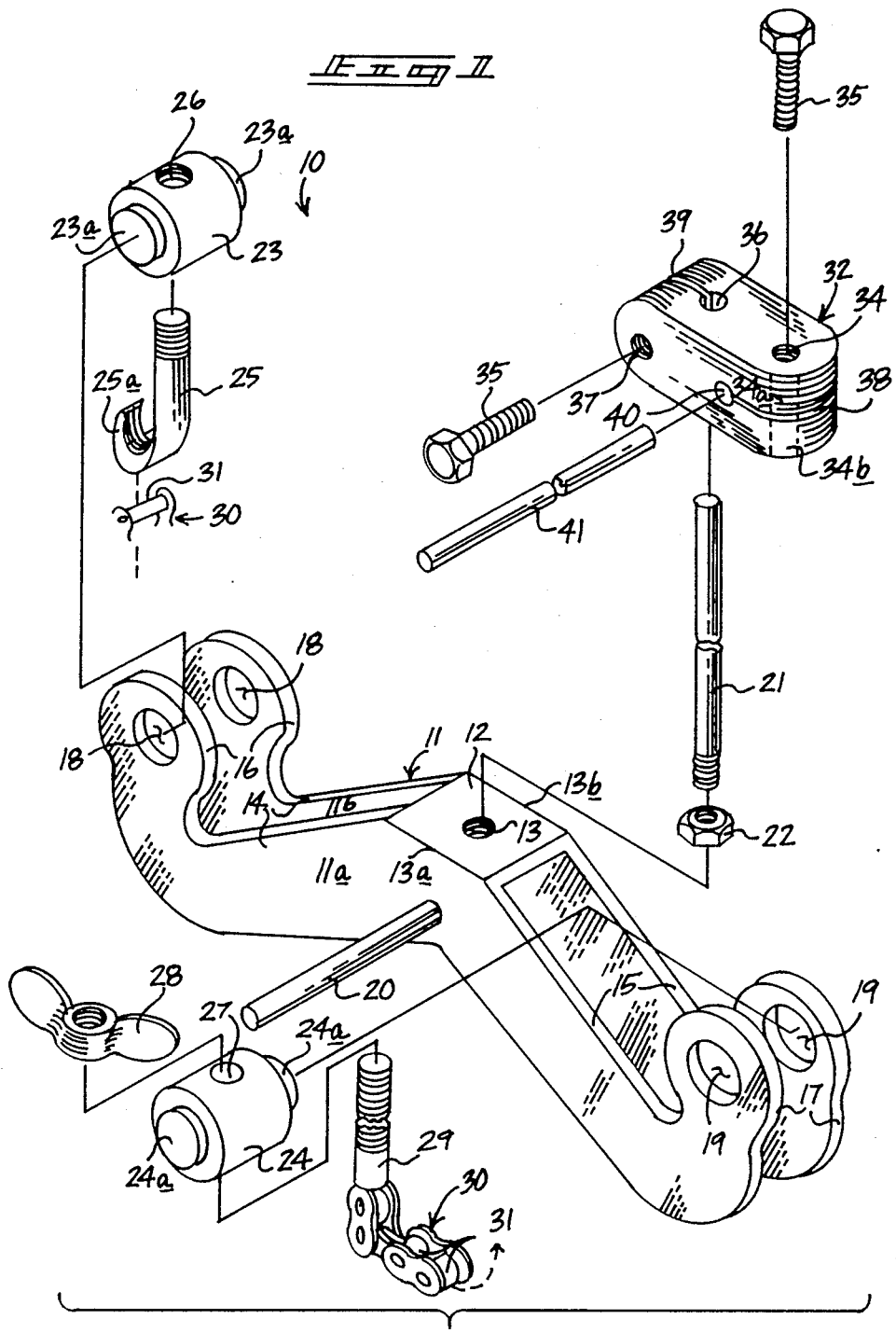

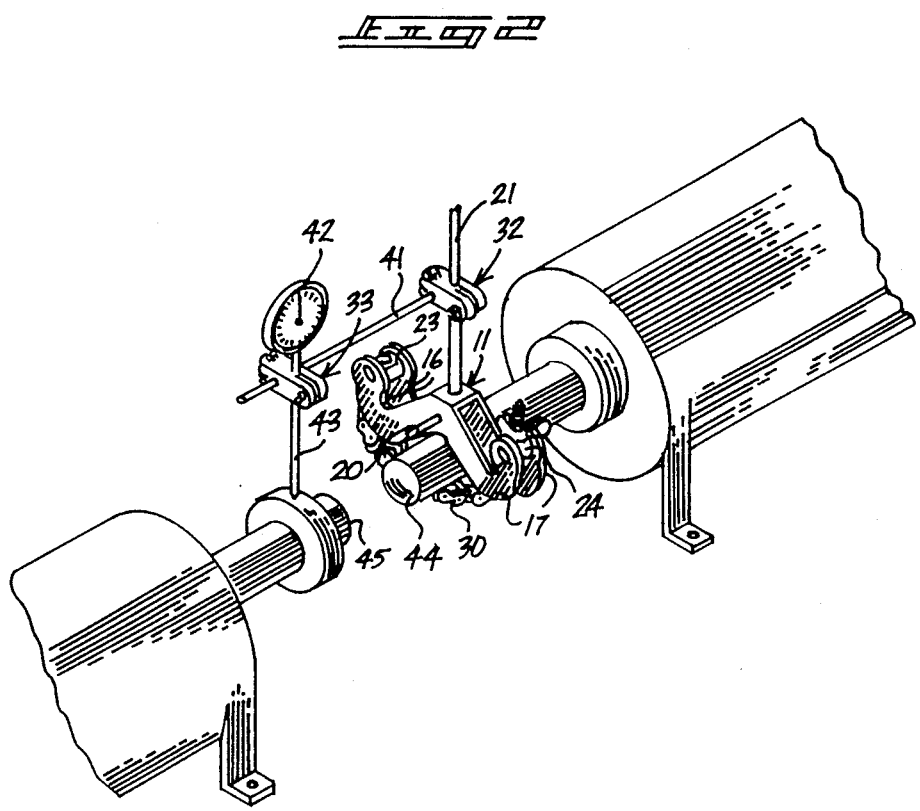

SHAFT ALIGNMENT APPARATUS

BACKGROUND OF THE INVENTION

1. Field of the Invention

The field of invention relates to alignment apparatus, and more particularly pertains to a new and improved shaft alignment apparatus wherein the same utilizes a yoke mountable to a first shaft to position the first shaft in alignment with a second shaft utilizing a dial indicator micrometer alignment apparatus.

2. Description of the Prior Art

The use of shaft alignment apparatus is well known in the prior art. Heretofore, the prior art apparatus has utilized devices that have been of a cumbersome or expansive organization limiting their efficient and effective utilization. The instant invention overcomes deficiencies of the prior art by providing an apparatus securable to a first shaft with an adjustable "W" clamp to accommodate thereby shafts of varying diameters and align such shafts with further shafts in an efficient manner. Examples of the prior art include U.S. Pat. No. 3,601,897 to Muller wherein an apparatus is set forth to coaxially mount a tool between opposed shafts to position their alignment. The deficiencies of such a device is in that unless opposed and aligned shafts are relatively close together, the apparatus is not readily adaptable to accommodate the shafts at extended distances.

U.S. Pat. No. 4,428,126 to Banks set forth an alignment apparatus wherein a single support shaft includes a plurality of opposed anchors that are positionable upon opposed tools with indicators directed from the single shaft to gauge alignment of the opposed shaft portions.

U.S. Pat. No. 4,534,114 to Woyton provides for a plurality of spaced beams positionable on opposed sides of a coupling to gauge and measure the coupling and enable alignment thereof such a coupling to ensure its positioning relative to opposed sides of the organization.

U.S. Pat. No. 4,516,328 to Massey provides a shaft alignment device wherein a plurality of clamps are securable to opposed shafts with parallel spaced gauging apparatus spanning the distance between the two clamps to gauge proper alignment between the opposed shafts.

U.S. Pat. No. 4,586,264 to Zatezalo sets forth a method utilizing a plurality of shafts and micrometers to position opposed shafts relative to one another to enable gauging of their proper alignment.

As such, it may be appreciated that there is a continuing need for a new and improved shaft alignment apparatus wherein the same addresses both the problems of ease of use and effectiveness in construction, and in this respect, the present invention substantially fulfills this need.

SUMMARY OF THE INVENTION

In view of the foregoing disadvantages inherent in the known types of shaft alignment apparatus now present in the prior art, the present invention provides a shaft alignment apparatus wherein the same includes a yoke adjustably mountable to a first shaft with a rod supported in parallel relationship to the first shaft to support a dial indicator micrometer arrangement to enable alignment of the first shaft relative to a second shaft. As such, the general purpose of the present invention, which will be described subsequently in greater detail, is to provide a new and improved shaft alignment apparatus which has all the advantages of the prior art shaft alignment apparatus and none of the disadvantages.

To attain this, the present invention comprises a "W" shaped yoke with a flaccid chain loop surroundable about the first shaft to engage and secure the yoke to the shaft. A plurality of spaced ears include pivot axles secured at each end of the yoke to enable rotation and accommodation of the chain of shafts of varying diameters. The yoke includes a first upstanding rod securable to a first clamp. The first clamp includes an alignment rod aligned parallel to the first shaft to secure a second clamp, and wherein the second clamp accommodates a dial indicator micrometer and rod orthogonally relative to the alignment rod to adjust a second shaft relative to the first shaft.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shaft alignment apparatus which has all the advantages of the prior art shaft alignment apparatus and none of the disadvantages.

It is another object of the present invention to provide a new and improved shaft alignment apparatus which may be easily and efficiently manufactured and marketed.

It is a further object of the present invention to provide a new and improved shaft alignment apparatus which is of a durable and reliable construction.

An even further object of the present invention is to provide a new and improved shaft alignment apparatus which is susceptible of a low cost of manufacture with regard to both materials and labor, and which accordingly is then susceptible of low prices of sale to the consuming public, thereby making such shaft alignment apparatus economically available to the buying public.

Still yet another object of the present invention is to provide a new and improved shaft alignment apparatus which provides in the apparatuses and methods of the prior art some of the advantages thereof, while simultaneously overcoming some of the disadvantages normally associated therewith.

Still another object of the present invention is to provide a new and improved shaft alignment apparatus wherein the same is positionable in a surrounding relationship to work shafts of varying diameters and accommodate the same in an adjustable manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric exploded view of the instant invention.

FIG. 2 is an isometric illustration of the instant invention in operative engagement with a plurality of spaced shafts to be aligned.

DESCRIPTION OF THE PREFERRED EMBODIMENT

With reference now to the drawings, and in particular to FIGS. 1 and 2 thereof, a new and improved shaft alignment apparatus embodying the principles and concepts of the present invention and generally designated by the reference numeral 10 will be described.

More specifically, the shaft alignment apparatus 10 essentially comprises a "W" shaped yoke 11 formed with a horizontal plate 12 formed with a forward edge 13a and a rear edge 13b spaced parallel relative to one another on opposed sides of the plate 12. A threaded bore 13 is orthogonally and medially directed through the plate 12 for reception of a vertical support rod 21 threaded at its lowermost end, to be described in more detail below. A forward plate 11a is spaced parallel to a rear plate 11b and the plates are secured to respective forward and rear edges of the plate 12. The forward and rear plates define a first leg pair 14 angulated downwardly at an acute angle relative to the upper surface of the plate 12 of equal configuration and terminate in upwardly extending first vertical ears 16. Similarly, a second leg pair 15 formed of the respective forward and rear plates 11a and 11b extend at an acute angle relative to the plate 12 in an opposed direction relative to the first leg pair 14 and terminate in a plurality of spaced parallel second vertical ears 17. The first and second vertical ears 16 and 17 include coaxially aligned first and second apertures 19 respectively through the first and second ears, wherein the apertures are orthogonally directed through the ears to provide the coaxial alignment. A horizontal first alignment and positioning rod 20 extends orthogonally and medially forwardly of the forward plate 11a orthogonally aligned to the axis of the threaded bore 13 to enable manual grasping for positioning of the "W" shaped yoke upon a support shaft and provide an alignment rod to assist in coaxial gauging of the "W" yoke over the first shaft 44, as illustrated in FIG. 2.

The vertical support rod 21 includes a threaded lower end and is threadedly received through the threaded bore 13 with a threaded securement nut 22 securable to the threaded lower end once the lower end is engaged with the threaded bore 13 to lock the rod in position with respect to the plate 12. The first apertures 18 receive a first pivot cylinder 23 of a diameter less than that of the first apertures 18 and is formed with coaxial aligned cylindrical axles 23a extending through either end of the first pivot cylinder 23. As the pivot cylinder 23 is of a length substantially equal to that of the spacing defined between the first vertical ears 16, the cylindrical axles 23 are received within the apertures 18 and rotatably mounted therein. Similarly, the second pivot cylinder is of an equal configuration to that of the first pivot cylinder and is formed with second axial cylindrical axles 24a cooperating with the second apertures 19 in a like manner as the first pivot cylinder. The first pivot cylinder 23 is formed with a threaded bore 26 to receive an upper threaded end of a "J" shaped hook 25, wherein the "J" shaped hook 25 includes a spaced upwardly extending hook leg 25a spaced from the threaded shaft a distance substantially equal to that of a chain axle 31 to receive the axle 31 therein. The second pivot cylinder includes a smooth bore diametrically directed medially through the second pivot cylinder in a position equal to that of the location of the first threaded bore 26 to slidingly receive a threaded clamp shaft 29 therethrough. The threaded clamp shaft 29 cooperates with an interiorly threaded wing nut 28 to tighten an associate flaccid link chain 30 that extends between the "J" shaped hook 25 and the threaded clamp shaft 29, as illustrated in FIG. 2 for example. Once the link chain 30 is directed about a first shaft 44, as illustrated, the "W" shaped yoke 11 is in position for accommodating the remaining organization, to be discussed below.

The vertical support rod 21 includes a smooth upper portion, as illustrated in FIG. 1, spaced above the lowermost threads to slidingly be received within a first smooth bore 36 orthogonally directed through an elongate first clamp 32. The first bore 36 is positioned medially adjacent a first end of the clamp 31 and is aligned with a second bore 34 that includes a smooth upper end 34a spaced from a threaded lower end 34b spaced from one another by a first slot 38. A threaded bolt 35 is received slidingly through the smooth upper bore 34a and is threadedly engaged within the threaded lower bore 34b to tighten and squeeze the upper and lower portions of the clamp divided by the first slot 38 about a second alignment rod 41 and is received within a fourth smooth bore 40 that is diametrically and coextensively aligned at an interior end of the first slot 38 in communication therewith. The first bore 36 receives the upper end of the support rod 21, as noted above, and is tightened thereabout by use of a third bore 37 formed with an upper smooth end and a threaded lower end in a like manner as the second bore 34 and utilizes a threaded bolt 35 to thereby clamp the support rod 21 upon tightening of the bolt 35 within the third bore 37 and thereby tightening upper and lower portions of the first clamp 32 spaced about a second slot 39. It is noted that a second slot 39 is diametrically directed through a first end of the clamp 32 and orthogonally oriented relative to the first slot 38 that is orthogonally directed through a second end of the first clamp 32. When alignment is complete, tab 46 is pushed away from center housing to release chain.

The second clamp 33, as illustrated in FIG. 2, is an exact duplicate of the first clamp 32 and its description is not deemed necessary. The second clamp 33 accordingly receives the second alignment rod 41 through a like fourth bore 40, as illustrated in the first clamp 32, to clamp the second clamp 33 in alignment relative to the first clamp 32. A dial indicator micrometer 42 is mounted at the upper end of a dial indicator micrometer rod 43 directed through a comparable first bore 36 to thereby precisely align the dial indicator micrometer rod 43 relative to the support rod 21, whereupon the second shaft 45 may be aligned relative to the first shaft 44 due to the exact and precise referencing of the dial indicator micrometer rod 42 relative to the support shaft 21 with the first alignment and positioning rod 20 assisting in alignment in a parallel and aligned relationship of the second alignment rod 41 relative thereto.

The manner of usage and operation of the instant invention therefore should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shaft alignment apparatus for coaxial alignment of spaced first and second shafts comprising,
   a clamp means for securement about the first shaft mounting a support rod extending above said clamp means, and
   a first clamp member secured to the support rod, and
   the first clamp member securing an alignment rod proximate a first end thereof orthogonally relative to the support rod, and
   a second clamp member secured to the alignment rod proximate a second end thereof spaced from the first end, and
   a dial indicator secured to a dial indicator shaft, the dial indicator shaft secured to the second clamp member, orthogonally relative to the alignment rod overlying the second shaft, and
   wherein the clamp means includes a "W" shaped yoke with a central plate including spaced parallel forward and rear edges with the forward edge mounting a forward plate and the rear edge mounting a rear plate with the forward and rear plates spaced parallel relative to one another and of equal configuration, the forward and rear plates define first and second pairs of legs aligned relative to one another and extending downwardly relative an upper surface of the support plate at an acute angle thereto, and the first and second pairs of legs in each include first and second pairs of ears respectively with each of the first and second pairs of ears extending upwardly therefrom, the first and second pairs of ears including pairs of first and second apertures directed through the respective first and second ears, the first apertures coaxially aligned relative to one another and of a first diameter and the second apertures coaxially aligned relative to one another and of an equal first diameter, and the first and second apertures rotatably mounting a respective first and second pivot cylinder, and the first and second pivot cylinder mounting a chain for securement about the first shaft.

2. A shaft alignment apparatus as set forth in claim 1 wherein the first pivot cylinder includes a threaded bore extending diametrically through the first pivot cylinder, and the threaded bore threadedly receiving a "J" shaped hook, the "J" shaped hook formed with an upwardly turned leg spaced from a shank defined by the hook a fixed distance, wherein the fixed distance is substantially equal to a diameter defined by a chain axle, the chain including a series of links, and each link including spaced chain axles.

3. A shaft alignment apparatus as set forth in claim 2 wherein the second pivot cylinder includes a smooth bore diametrically directed therethrough for slidingly receiving a threaded shank, the threaded shank integrally secured to a forward terminal end of the chain, and a securement means cooperating with the threaded shank to enable tightening of the chain about the first shaft when the threaded shank is directed through the smooth bore of the second pivot cylinder.

4. A shaft alignment apparatus as set forth in claim 3 wherein each pivot cylinder includes a main body of a first diameter greater than a diameter defined by the first and second apertures and each pivot cylinder further including coaxially aligned axles of a diameter substantially equal to the diameter defined by the apertures, and each pivot cylinder of a length substantially equal to a spacing defined between the legs of the "W" shaped clamp.

5. A shaft alignment apparatus as set forth in claim 4 wherein the first clamp and the second clamp are of duplicate configuration, and the first clamp includes a first bore for receiving the support rod therethrough, the first bore aligned with and in communication with a second slot extending orthogonally through a first end of the first clamp, and a fourth bore formed orthogonally relative to the first bore for receiving the alignment rod therethrough and the fourth bore coextensive with and in communication with a first slot orthogonally aligned relative to the second slot, and the first and second slots each receiving a clamping member orthogonally through the first and second slots to squeeze opposed portions of the first clamp spaced on opposed sides of the first and second slots and thereby clamp the respective support rod and alignment rod within the respective first and fourth bores, and the clamping members directed through respective second and third bores to receive the clamping members relative to the respective first and second slots.

6. A shaft alignment apparatus as set forth in claim 5 wherein the forward plate of the "W" shaped yoke includes a further alignment rod directed orthogonally relative to the forward plate and orthogonally relative to the threaded bore directed through the support plate, wherein the further alignment rod is positioned medially of the forward plate.

* * * * *